United States Patent [19]

Watanabe et al.

[11] 4,307,577
[45] Dec. 29, 1981

[54] AIR CONDITIONING SYSTEM MAKING USE OF WASTE HEAT

[75] Inventors: Hideyuki Watanabe, Urawa; Tadao Shimada, Omiya; Yonezo Ikumi, Tatebayashi; Atsuo Fukino; Hiroyoshi Kusakabe, both of Gunma, all of Japan

[73] Assignees: Agency of Industrial Science & Technology; Ministry of International Trade & Industry, both of Tokyo, Japan

[21] Appl. No.: 134,451

[22] Filed: Mar. 27, 1980

[30] Foreign Application Priority Data

Mar. 12, 1980 [JP] Japan ................................. 55-30286

[51] Int. Cl.³ ........................................... F25B 27/02
[52] U.S. Cl. ..................................... 62/238.3; 62/335
[58] Field of Search ................... 62/144, 238 B, 324 B, 62/335

[56] References Cited

U.S. PATENT DOCUMENTS

| | | | |
|---|---|---|---|
| 1,887,909 | 11/1932 | Altenkirch | 62/335 |
| 2,027,610 | 1/1936 | Nesselmann et al. | 62/238 B |
| 2,182,098 | 12/1939 | Sellew | 62/238 B |
| 2,982,864 | 5/1961 | Furreboe | 62/238 B |
| 4,207,751 | 6/1980 | Kampfenkel et al. | 62/238 B |

Primary Examiner—Lloyd L. King
Attorney, Agent, or Firm—Fleit & Jacobson

[57] ABSTRACT

An air conditioning system making use of waste heat comprising a compound absorption refrigeration machine and absorption type heat pump for both cooling and heating. The refrigeration machine and the heat pump are connected in parallel to the load to obtain hot water for utility of air heating, and the refrigeration machine operates utilizing hot water produced by the heat pump to produce cold water for air cooling.

5 Claims, 6 Drawing Figures

AIR CONDITIONING SYSTEM MAKING USE OF WASTE HEAT

BACKGROUND OF THE INVENTION

The present invention relates to an air conditioning system making use of waste heat constituted by a compound absorption type refrigeration system having an absorption type heat pump and an absorption refrigeration machine which acts for both of cooling and heating.

Waste water discharged from various factories or plants usually has a temperature of 60° C. or so. If waste water of this temperature is available at the servicing end, the heat possessed by this water can be practically utilized. This heat, however, has no use in most cases because the water is cooled considerably on its way to the servicing end.

In order that the water discharged from a factory or a plant is utilized at the servicing end for air heating or hot water supply, it is necessary that the waste water has a temperature of about 80° to 90° C. or higher at the water discharge end of the factory or plant, but in general these high temperature energies are obtained by a heat pump making use of high level energy such as fuels, steam or electricity. To the contrary, if the waste water is to be used for air cooling as an air conditioning purpose, the waste water temperature must be 5° to 7° C. at the servicing end.

SUMMARY OF THE INVENTION

Under the circumstances described above, a principal object of the present invention is to provide an air conditioning system incorporating an absorption refrigerating cycle which can produce hot water for utility or air supply, or cold water or ice for air cooling.

Another object of the present invention is to provide the air conditioning system as described, making use of only warm waste water of about 60° C. or so discharged from a factory or a plant without making use of high level energy such as gas, oil or steam.

Another object of the present invention is to provide an air conditioning system having an absorption type heat pump which is simple in structure to reduce the weight and size of the system.

Another object of the present invention is to provide an air conditioning system which permits improvement in the efficiency of the system.

Briefly, the air conditioning system according to the present invention has, in combination, an absorption refrigeration machine switchable between operational modes for cooling and for heating, and an absorption type heat pump. The refrigeration machine employs a high-temperature fluid, and the heat pump uses warm waste water to make a high temperature fluid for the refrigeration machine. In the operational mode for heating, the refrigeration machine and the heat pump are connected in parallel to the load to obtain warm water for utility or air heating, whereas the refrigeration machine employs the hot water produced by the heat pump to produce cold water for cooling purpose.

The absorption type heat pump may be formed by two heat pumps connected in two stages.

It is preferred that the absorption type heat pump includes an upper barrel containing a first stage absorber, a second stage absorber and an evaporator common to the first and second stage, a lower barrel containing a first stage generator, a second stage generator and a condenser common to the first and second stages, and wherein warm water is used for heating said evaporator and the first stage generator, cooling water is used for cooling the condenser and the warm water heated by the first stage absorber is used for transferring heat to the second stage generator, whereby hot water is available at said second stage absorber as a result of operation of two heat pump cycles.

Heat exchangers may preferably be disposed between the first stage generator and the first stage absorber and between the second stage generator and the second stage absorber, respectively.

In order that the liquefied refrigerant in the evaporator may forcibly be dropped onto the heat transfer tubes, a refrigerant pump can be attached to the condenser, and a refrigerant circulation pump can be attached to the evaporator.

DETAILED DESCRIPTION OF THE INVENTION

The heat pump making use of an absorption refrigerating cycle is an apparatus adapted to evaporate a refrigerant by heat absorbed from a low-temperature heat source such as warm water and to produce warm water of a comparatively high temperature by a heat which is generated by a reaction taking place when the vapor of the refrigerant is absorbed by solution of absorbent, whereas the refrigeration machine is an equipment or system which produces cold water from which the refrigerant takes off latent heat through its evaporation.

Figure 1:
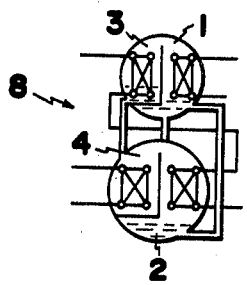
FIG. 1 is a diagram showing a so-called heat pump of the first kind.

There are two types of heat pumps. FIG. 1 shows a so-called heat pump of the first kind in which hot water, steam or the like is used as the driving heat source for heating a diluted solution of absorbent in a generator 1. An absorber 2 is cooled to a temperature lower than that of the generator 1, while the temperature in a condenser 3 for cooling and liquefying the gaseous refrigerant is higher than the temperature in the evaporator 4 so heated water hotter than the heat source which is supplied to the evaporator can be obtained from the condenser and absorber circuit.

Figure 2:
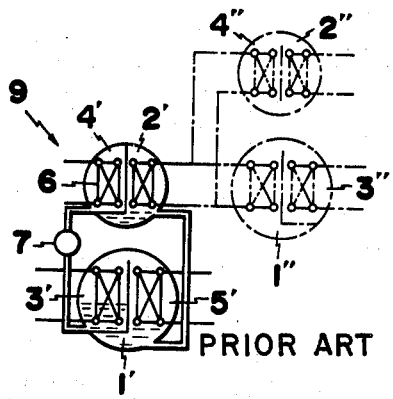
FIG. 2 is a diagram showing a so-called heat pump of the second kind.

FIG. 2 shows a so-called heat pump of the second kind in which only warm water is used as the driving heat source 5' without making use of hot water or steam as mentioned above with reference to the heat pump of the first kind for heating diluted solution of absorbent in a generator 1' and an absorbing heat source 6 for an evaporator 4', and a refrigerant pump 7 is provided for feeding a refrigerant from a condenser 3' to an evaporator 4' so that the cycle can operate while maintaining the temperature in an absorber 2' and the evaporator 4' higher than those in the generator 1' and the condenser 3', respectively, so heated water hotter than the driving heat source which is supplied to the generator and evaporator can be obtained from the condenser and absorber circuit.

The second-kind of heat pump is employed only for heating purpose, whereas the operation mode of the first-kind of heat pump is switchable between cooling and heating. In the present specification, therefore, the heat pumps of the first and second kinds will be referred to as a switchable absorption refrigeration machine and an absorption type heat pump, respectively, for convenience sake.

Figure 3:
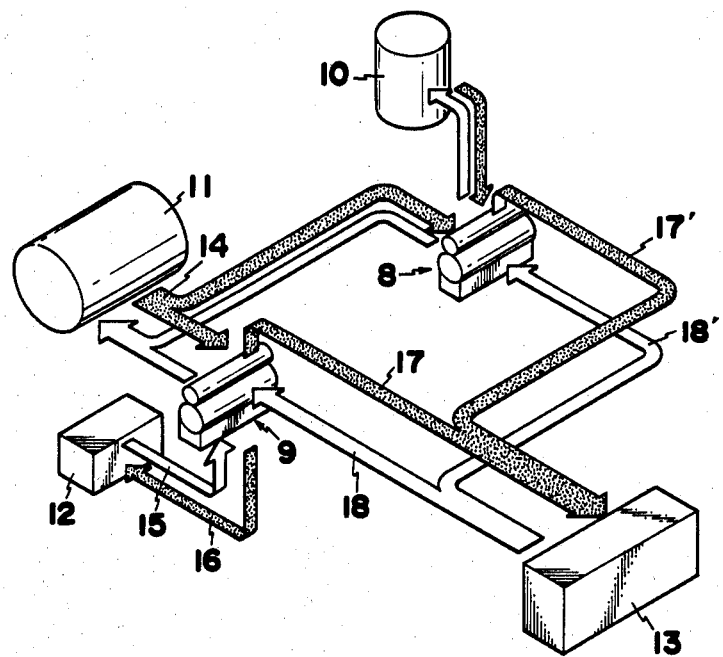
FIG. 3 is a diagram showing an air conditioning system of the present invention in the state of heating operation.

FIG. 3 shows an air conditioning system of the invention in the state of operation for heating as in the case of winter season. In FIG. 3, a reference numeral 8 denotes an absorption refrigeration machine of the switchable type mentioned before, while the aforementioned absorption type heat pump is designated at a reference numeral 9. A reference numeral 10 denotes a boiler for generating hot water or steam which is used for driving the absorption type refrigerator 8. A reference numeral 11 designates a heat machine which constitutes the source of hot waste water. Reference numerals 12 and 13 denote, respectively, a source of cooling water such as river water, water circulated through a cooling water or sea water and a servicing end for air heating or hot water supply.

Waste warm water of about 55° C. flows from the warm water source 11 through an inlet pipe 14 into both of the evaporator 4' and generator 1' of the absorption type heat pump 9, as well as into the evaporator 4 of the switchable absorption refrigeration machine 8, and is then wasted. On the other hand, the cooling water of about 15° C. coming from the cooling water source 12 through an inlet pipe 15 flows through the condenser 3' of the absorption type heat pump 9 to cool and liquefy the refrigerant and is then recirculated or wasted through an outlet pipe 16. Further, the steam of about 160° C. generated by the boiler 10 heats the diluted solution of absorbent in the generator 1 to drive the absorption refrigeration machine and is then returned to the boiler 10.

In the absorption type heat pump 9 and the absorption refrigeration machine 8 thus provided with warm water, cooling water and high-temperature fluid, the absorbers 2 and 2' and the condenser 3 can be heated up to temperatures higher than 90° C., so that brine circulated between the system and the servicing end 13 through pipes 17, 17', 18 and 18' can be heated up to 90° C., so that the brine can be used at the servicing end as the heat source for air heating or hot water supply.

In the system of the present invention, it is only necessary to drive the absorption type heat pump 9 of the second kind if a supply of the warm waste water is fulfilled, and a general type of heat pump (i.e., the absorption type refrigerator 8) does not have to be operated. The heat pump 8 is supplementarily operated in cases of extremely low ambient temperature, of overload or of shortage of the warm waste water. Accordingly, it is not necessary, in general, to use high temperature energies such as steam or hot water.

Figure 4:
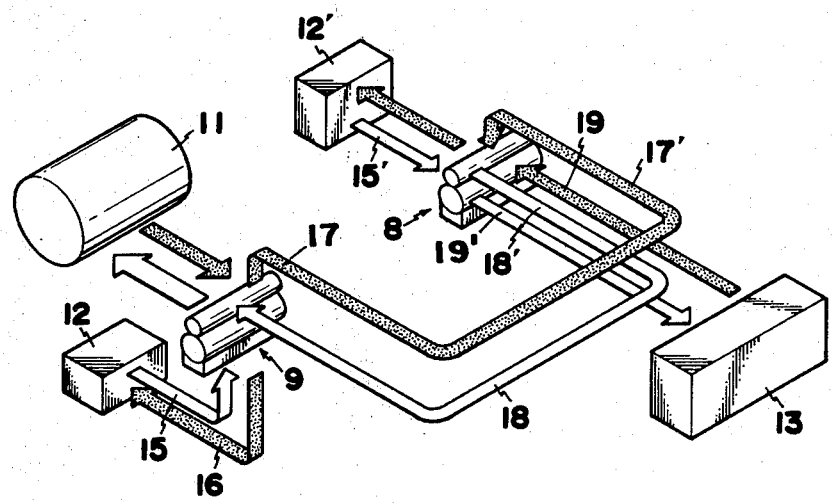
FIG. 4 is a diagram showing the air conditioning system according to the present invention in the state of cooling operation.

FIG. 4 shows the air conditioning system of the invention in the state of cooling operation as in the summer season. Warm water of about 60° C. and cooling water of about 25° C. are supplied to the absorption type heat pump 9, and high-temperature water of about 80° C. is taken out of the same, in the same manner as the heating operation explained before. However, in the absorption refrigeration machine, the high-temperature water obtained from the absorption type heat pump 9 is circulated through the pipes 17, 17', 18 and 18' to serve as the heat source for the generator 1 of the absorption refrigeration machine. At the same time, in order to liquefy in the condenser 3 the gaseous refrigerant generated in the generator 1, and in order to permit an efficient absorption of refrigerant evaporated in the evaporator 4, the cooling water flowing from the cooling water source 12' through an inlet pipe 15' is returned to the cooling water source 12' through the absorber 2 and the condenser 3, so that it is possible to cool the evaporator 4 down to a temperature below 4° C.

It is therefore possible to cool the brine, which is circulated between the system and the servicing end 13 through the pipes 19 and 19', down to a temperature below about 6° C. so as to be used as the cold heat source for air cooling in the day time, whereas, in the night, the rate of circulation of the brine through the evaporator 4 is decreased to produce ice by recirculation of brine of a temperature below 0° C. thereby to store the cold heat to prepare for the peak load of cooling expected in the day time.

Practically, the absorption type heat pump 9 for obtaining the temperature condition as shown in FIGS. 3 and 4 may be constituted by absorption type heat pumps connected in two stages as shown by imaginary lines in FIG. 2. In the drawing, double-primed numerals 1", 2", 3" and 4" denote, respectively, a generator, absorber, condenser and an evaporator.

The absorption type heat pump 9 may be constituted by two stages of heat pumps as stated above. However, in order to reduce the weight and size of the system, an arrangement as shown in FIG. 5 is preferably adopted.

Figure 5:
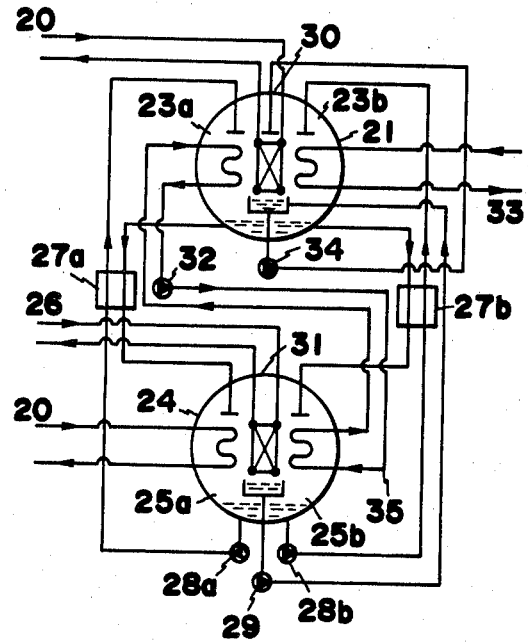
FIG. 5 is a diagram of an absorption type heat pump adapted to the air conditioning system of the present invention.

The absorption type heat pump as shown in FIG. 5 has a reduced size as compared with the above-mentioned absorption type heat pump constituted by two stages of heat pumps, but can exhibit a performance equivalent to that of the latter. More specifically, this absorption type heat pump has an upper barrel accomodating a first stage absorber and a second stage absorber, as well as an evaporator for the first and second stage, and a lower barrel accomodating a first stage generator and a second stage generator, as well as a condenser for the first and second stage. The evaporator and the first stage generator are heated by warm water, while the condenser is cooled by cooling water. On the other hand, warm water heated by the first stage absorber is used for transmitting heat to the second stage generator. According to this arrangement, the heat pump cycles of the first and second stages are operated and high-temperature water is obtained at the second-stage absorber.

This absorption type heat pump will be described in detail hereinunder.

Referring to FIG. 5, an upper barrel 21 accomodates a first stage absorber 23a, a second stage absorber 23b and an evaporator 30 commonly used for both of the first and second stages, whereas a lower barrel 24 accomodates a first stage generator 25a, second stage generator 25b and a condenser 31 commonly used for both of the first and second stages.

External pipes are connected for the supply and discharge of warm water 20 which is used as the heating source for the evaporator 30, as well as for the driving heat source for the first stage generator 25a. Also, piping is provided for the supply and discharge of cooling water 26 which is used as the heat absorption source for the condenser 31. In addition, a piping is provided to introduce the warm water, which has been heated by the first stage absorber 23a, supplied to the second stage generator 25b to work as the driving heat source and discharged from the latter. Further, warm water is introduced and discharged so that hot water or steam 33 may be taken out of the second stage absorber 23b.

In order to improve the efficiency of the system, heat exchangers 27a and 27b are interposed between the first stage generator 25a and the first stage absorber 23a, and between the second stage generator 25b and the second stage absorber 23b, respectively. Absorbent liquid pumps 28a and 28b are installed in the first and second stages, while a refrigerant pump 29 is attached to the condenser 31. Also, a warm water pump 32 is attached to the first stage absorber 23a. Finally, a refrigerant circulating pump 34 for forcibly dropping the liquefied refrigerant in the evaporator 30 onto the heat transfer tubes is installed together with its associated pipes.

The absorption type heat pump having the described construction operates in a manner described hereinunder. The vapor of refrigerant generated in the lower barrel 24 is condensed and liquefied in the condenser 31, and the liquid refrigerant is delivered to the evaporator 30 by means of the refrigerant pump 29. The absorbent solution is divided into two fractions: one for the cycle of the first stage and the other for the cycle of the second stage. In the cycle of the first stage, the absorbent solution is heated in the first stage generator 25a by the warm water 20 to become a concentrated solution which in turn is transferred to the first stage absorber 23a through the absorbent liquid pump 28a. The concentrated solution of absorbent then absorbs in the first stage absorber 23a the refrigerant evaporated in the evaporator 30 and transmits the absorption heat to the fluid flowing through the heat transfer tubes. On the other hand, in the cycle of the second stage, the absorbent solution is heated in the second stage generator 25b by the warm water 35 coming from the first stage absorber 23a to become a concentrated solution absorbent. This concentrated solution of absorbent is introduced by the absorbent solution pump 28b into the second stage absorber 23b so as to absorb the refrigerant coming from the evaporator 30. In the course of this absorption, absorption heat is generated to heat the warm water 33 flowing through the second stage absorber 23b. The absorbent solution, which has been diluted as a result of absorption of the refrigerant has heated the warm water, is returned to the second stage generator 25b and is heated to become a concentrated solution of absorbent to repeat the above-described cycle.

Figure 6:
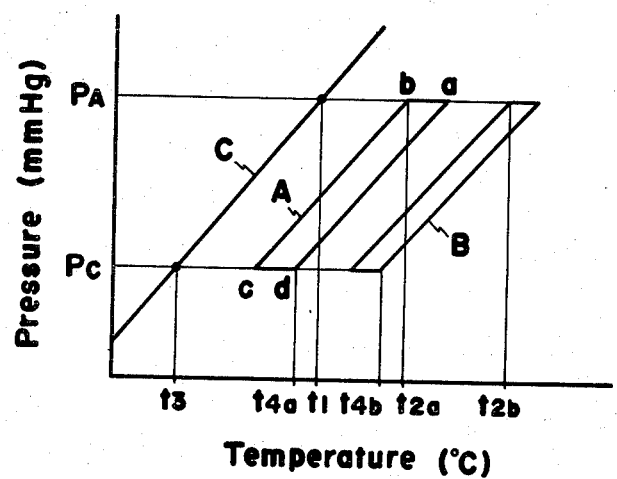
FIG. 6 is a Dühring chart showing the operation cycle of the heat pump illustrated in FIG. 5.

FIG. 6 is a Dühring chart showing the operation cycle of the absorption type heat pump shown in FIG. 5. In this Figure, a symbol A denotes a recirculating cycle of absorbent solution in the first stage, whereas symbol B represents the recirculating cycle of absorbent solution in the second stage. The recirculating cycle of refrigerant is shown at C. Symbols $t_1$ to $t_{4b}$ represent, respectively, the following temperatures:

$t_1$: temperature at which the refrigerant evaporates in the evaporator 30 heated by the warm water 20.

$t_{2a}$: temperature at which the absorbent solution completes the absorption of the refrigerant in the first stage absorber 23a.

$t_3$: temperature at which the refrigerant vapor is liquefied in the condenser 31.

$t_{4a}$: temperature at which the absorbent solution completes its concentration in the first stage generator 25a.

$t_{2b}$: a temperature at which the absorbent solution completes the absorption of the refrigerant in the second stage absorber 23b.

$t_{4b}$: a temperature at which the absorbent solution completes its concentration in the second stage generator 25b.

Symbols $P_A$ and $P_B$ represent the pressures in the upper and lower barrels, respectively. On the absorbent solution circulation A, a→b represents the absorption of the refrigerant in the absorber, b→c represents the change of the diluted solution in the course of heat exchange between the diluted solution and concentrated ones, c→d represents the concentration of the absorbent solution through its boiling process in the generator, and d→a represents a change of concentrated solution corresponding to the heat exchange b→c.

The absorption type heat pump shown in FIG. 5, constituted by two barrels, has a reduced weight and can be produced at a lower cost as compared with the heat pump shown in FIG. 2 having four barrels. In addition, since the heat transfer medium for transferring heat from the first stage absorber to the second stage generator is not in the vacuum system, the cost of the pump can be reduced if warm water or the like is used as the medium.

As has been described, according to the invention, a boiler 10 is used in the switchable absorption refrigeration machine in the operation mode for air heating. This, however, is intended for improving the efficiency of the system as a whole by operating the absorption refrigeration machine even during air heating. Thus, as a matter of concept, it is possible to obtain hot water for air heating and hot water supply in the winter season, as well as cold water for cooling purpose in the summer season, solely with the warm discharge water of low temperature.

It will be seen from the foregoing description that the present invention makes it possible to effectively utilize warm waste water of 60° C. or so, which has had almost no use hitherto, for air conditioning and hot water supply. This clearly contributes greatly to the economical use of heat and heat recovery.

Although the present invention has been described with reference to the preferred embodiments thereof, many modifications and alterations may be made within the spirit of the present invention.

What is claimed is:

1. An air conditioning system making use of waste heat comprising, in combination, an absorption refrigeration machine switchable between operation modes for cooling and heating, said refrigeration machine using a high-temperature fluid such as hot water or steam as a first driving heat source, and an absorption type heat pump making use of warm waste water as a second driving heat source and as an absorption heat source to thereby obtain hot water hotter than said second driving heat source, whereby, in the operation mode for heating, said absorption refrigeration machine and said absorption type heat pump are connected in parallel to a load so that hot water obtained by the heating mode of said absorption refrigeration machine and hot water obtained from said absorption type heat pump are directly fed to said load, whereas, in the operation mode for cooling, said absorption refrigeration machine is operated utilizing the hot water produced by said absorption type heat pump as a heat source to produce cold water or ice for cooling purpose, the hot water produced by said absorption type heat pump replacing said first driving heat source in the operation mode for cooling.

2. An air conditioning system according to claim 1, in which said absorption type heat pump is constituted by two heat pumps connected in two stages, each of said heat pumps having an upper barrel containing an absorber and an evaporator, and a lower barrel containing a condenser and a generator.

3. An air conditioning system according to claim 1, in which said absorption type heat pump includes an upper barrel containing a first stage absorber, a second stage absorber and an evaporator common to the first and second stages, a lower barrel containing a first stage generator, a second stage generator and a condenser common to the first and second stages, and wherein warm water is used for supplying heat to said evaporator and said first stage generator, cooling water is used for cooling said condenser and the warm water heated by said first stage absorber is used for transferring heat to said second stage generator, whereby hot water is available at said second stage absorber as a result of operation of two heat pump cycles.

4. An air conditioning system according to claim 3, characterized by further comprising heat exchangers disposed between said first stage generator and said first stage absorber and between said second stage generator and said second stage absorber, respectively.

5. An air conditioning system according to claim 4, characterized by further comprising a refrigerant pump attached to said condenser, a warm water pump attached to said first stage absorber and a refrigerant circulation pump attached to said evaporator, whereby the liquefied refrigerant in said evaporator is forcibly dropped onto the heat transfer tubes.

* * * * *